Jan. 10, 1933.　　　A. A. GUERINI　　　1,893,889
BUTTER SPREADER
Filed Sept. 9, 1931
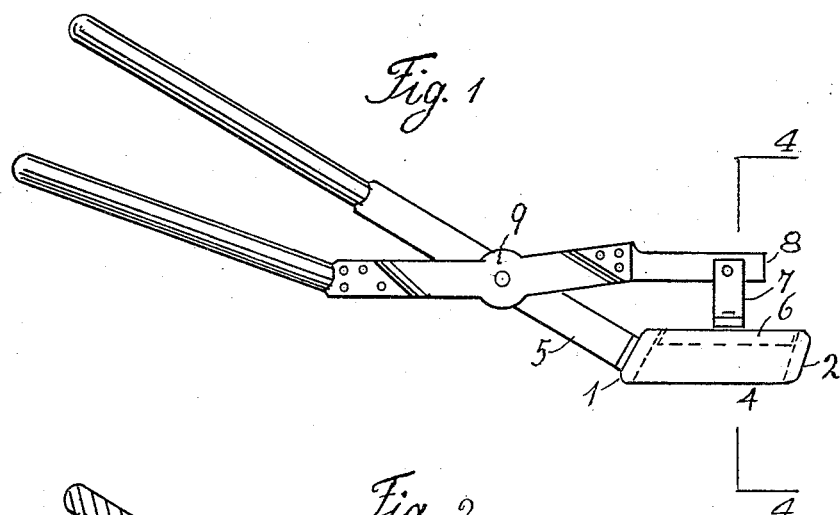
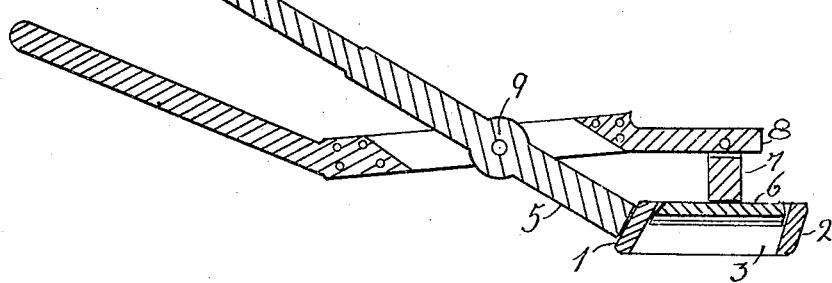
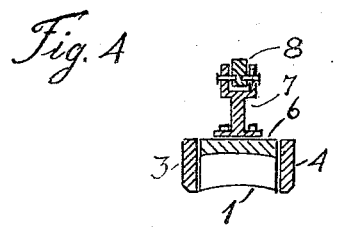
INVENTOR.
Annibale A. Guerini Patented Jan. 10, 1933

1,893,889

UNITED STATES PATENT OFFICE

ANNIBALE A. GUERINI, OF BRONX, NEW YORK

BUTTER SPREADER

Application filed September 9, 1931. Serial No. 561,856.

This invention is a butter spreader, particularly adapted for use in spreading butter on corn on the cob.

Speaking generally, this invention consists of a casing with a vertical passage through it, a plunger element moving through said passage and controlled by movable handles which are pivoted on each other. The plunger is moved so as to keep butter against the desired surface.

Features of the invention, other than those adverted to, will be apparent from the hereinafter description and claims when read in conjunction with the accompanying drawing.

The accompanying drawing illustrates one practical embodiment of the invention, but the construction therein shown, is to be understood as illustrative, only, and not as defining the limits of the invention.

Figure 1 is a side elevation of the device.

Figure 2 is a vertical cross section of Figure 1, showing the movable parts.

Figure 3 is a top view.

Figure 4 is a vertical section on the line 4—4.

In the structure as shown in the drawing, there is a rectangular casing having walls, 1, 2, 3, 4, through which a plunger 6 moves vertically. To the wall 1 of the casing there is affixed a handle 5. A vertical bracket 7 connects the plunger to a handle 8. The handles 5 and 8 are pivoted to one another by the pin 9 so as to be capable of moving the plunger vertically through the casing.

In operation, the device is inverted, the plunger 6 is retracted and butter is placed within the casing, so as to substantially fill the same. Thereupon the device is brought into its normal position with the open side of the same bearing against the corn on the cob to be buttered. If desired, the walls at the open side of the casing may be curved as shown in Figure 4 to conform with the circular cross section of the corn.

The device is drawn over the surface, spreading butter thereon. As the butter is consumed, slight hand pressure is put upon the handles, which, in turn, cause the plunger to move toward the surface to which butter is being applied, keeping the butter constantly in contact with said surface. This tends to give an even and satisfactory distribution of butter to the surface, and does not waste the butter.

This device may be constructed from any desired material, such as metals or suitable wood which has been treated, so as to guard against absorption. Also, the shape of the casing and plunger need not be rectangular, but may be round, or of any desired contour. The invention is not limited to any one form. The surface of the device which is pressed against the surface to be buttered, may be curved or flat to coincide with said surface, as stated.

Although the walls 1–4 of the casing may be perpendicular to the top edge thereof, the end walls are preferably curved on the arc of a circle of which the pivot 9 is the center. This is desirable if the connection between the bracket 7 and the handle 8 is rigid, although it is not necessary if the parts are pivoted together as shown.

Having thus fully described the invention, what I claim as new and desire to secure by Letters Patent is:

1. A butter spreader consisting of a casing having an open bottom, a plunger operable in the casing toward and away from the open bottom, and adapted to act upon butter contained within the casing below the plunger, and a pair of handles pivoted to one another, one fixed to the casing and the other to the plunger, and operable to move the plunger in the direction of the open bottom to maintain the butter therein in engagement with the article to be buttered.

2. A butter spreader comprising a butter holding casing provided therein with a plunger, a pair of handles pivoted to one another and respectively secured to the casing and the plunger, said handles being operable to guide the spreader over the articles to which butter is to be applied and simultaneously serving to maintain the butter in contact with such article, the interior of said casing being curved on the arc of a circle of which the pivotal connection between the two handles is substantially the center.

3. A butter spreader comprising a butter holding casing of substantially rectangular form and having an open bottom, a handle extending laterally from one side of the casing, a plunger operable within said casing to force butter therein in the direction of the open bottom, a second handle pivoted to the first handle intermediate its ends and also operatively connected to the plunger.

In testimony whereof, I have signed the foregoing specification at New York city, county and State of New York, this 4th day of April, 1932.

ANNIBALE A. GUERINI.